(12) United States Patent
Chen et al.

(10) Patent No.: US 10,079,658 B2
(45) Date of Patent: Sep. 18, 2018

(54) SEARCH SPACE DESIGN FOR E-PDCCH IN WIRELESS COMMUNICATION NETWORKS

(71) Applicant: QUALCOMM Incorporated, San Diego, CA (US)

(72) Inventors: Wanshi Chen, San Diego, CA (US); Tao Luo, San Diego, CA (US); Jelena Damnjanovic, San Diego, CA (US); Peter Gaal, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 917 days.

(21) Appl. No.: 13/666,670

(22) Filed: Nov. 1, 2012

(65) Prior Publication Data
US 2013/0114529 A1  May 9, 2013

Related U.S. Application Data

(60) Provisional application No. 61/556,144, filed on Nov. 4, 2011, provisional application No. 61/707,494, filed on Sep. 28, 2012.

(51) Int. Cl.
*H04W 72/04* (2009.01)
*H04L 1/18* (2006.01)
(Continued)

(52) U.S. Cl.
CPC .......... *H04L 1/1829* (2013.01); *H04L 1/0038* (2013.01); *H04L 1/1812* (2013.01);
(Continued)

(58) Field of Classification Search
CPC ... H04L 1/1812; H04L 1/1829; H04L 5/0053; H04L 5/001; H04L 5/0037
(Continued)

(56) References Cited

U.S. PATENT DOCUMENTS

2009/0238091 A1* 9/2009 Kim ............... H04L 5/0091
370/252
2010/0120424 A1* 5/2010 Johansson ........ H04L 5/0053
455/435.1
(Continued)

FOREIGN PATENT DOCUMENTS

CN  101925109 A  12/2010
CN  102164416 A   8/2011
(Continued)

OTHER PUBLICATIONS

Catt: "Design of enhanced PDCCH in Rel-11", 3GPP Draft; R1-112119, 3rd Generation Partnership Project (3GPP), Mobile Competence Centre; 650, Route des Lucioles; F-06921 Sophia-Antipolis Cedex; France, vol. RAN WG1, no. Athens, Greece; Aug. 22, 2011, Aug. 16, 2011 (Aug. 16, 2011), XP050537293, [retrieved on Aug. 16, 2011].*

(Continued)

*Primary Examiner* — Melvin Marcelo
*Assistant Examiner* — Natali N Pascual Peguero
(74) *Attorney, Agent, or Firm* — Patterson & Sheridan, L.L.P

(57) ABSTRACT

An enhanced physical downlink control channel (e-PDCCH) may provide carrier aggregation (CA) enhancements, help support new carriers which may not be backwards compatible, reduce control channel capacity limitations of coordinated multipoint (CoMP) transmissions, and enhance DL MIMO. In wireless communication networks, such as Long Term Evolution (LTE), user equipments (UEs) may monitor both a common search space and a UE-specific search space in a control region. A search space may comprise a set of channel control element (CCE) locations where a UE may find its PDCCHs. One or more CCEs are used to transmit each PDCCH. Certain aspects provide methods and apparatus for determining a search space (Continued)

comprising a subset of CCEs located on a band edge of available frequency resources, and performing a search of the search space to decode at least one PDCCH.

45 Claims, 12 Drawing Sheets

(51) Int. Cl.
  *H04L 1/00* (2006.01)
  *H04L 5/00* (2006.01)
(52) U.S. Cl.
  CPC ............ *H04L 5/0053* (2013.01); *H04L 5/001* (2013.01); *H04L 5/0037* (2013.01)
(58) Field of Classification Search
  USPC .................................................. 370/328, 329
  See application file for complete search history.

(56) References Cited

U.S. PATENT DOCUMENTS

| | | | |
|---|---|---|---|
| 2011/0170496 A1 | 7/2011 | Fong et al. | |
| 2013/0044664 A1* | 2/2013 | Nory ..................... | H04L 1/0045 370/311 |
| 2013/0058285 A1* | 3/2013 | Koivisto ............... | H04L 1/0046 370/329 |
| 2013/0064216 A1* | 3/2013 | Gao ..................... | H04L 5/0016 370/330 |
| 2014/0293975 A1 | 10/2014 | Kim et al. | |

FOREIGN PATENT DOCUMENTS

| | | | | |
|---|---|---|---|---|
| EP | 2757725 A1 | 7/2014 | | |
| WO | 2010053984 A2 | 5/2010 | | |
| WO | WO 2011085195 A1 * | 7/2011 | ............. | H04L 5/001 |
| WO | 2011126212 A2 | 10/2011 | | |
| WO | 2011137383 A1 | 11/2011 | | |
| WO | WO 2011137383 A1 * | 11/2011 | ........ | H04W 72/1289 |
| WO | 2012109542 A1 | 8/2012 | | |
| WO | 2013062374 A1 | 5/2013 | | |

OTHER PUBLICATIONS

LG Electronics: "On ePDCCH Search Space Design Supporting Localized and Distributed Transmission", 3GPP Draft; R1-122309 ePDCCH SS_LG, 3rd Generation Partnership Project (3GPP), Mobile Competence Centre; 650, Route Des D Lucioles ; F-06921 Sophia-Antipolis Cedex; France, vol. RAN WG1, no. Prague, Czech Republic; May 21, 2012-May 25, 2012, May 12, 2012.*
Samsung: "Discussion on ePDCCH Design Issues", 3GPP Draft; R1-112517 ePDCCH, 3rd Generation Partnership Project (3GPP), Mobile Competence Centre ; 650, Route Des D Lucioles ; F-06921 Sophia-Antipolis Cedex ; France, vol. RAN WG1, no. Athens, Greece; Aug. 22, 2011, Aug. 16, 2011, XP050537597, [retrieved on Aug. 16, 2011].*
Catt: "Design of Backhaul Control Channel for Type I Relay in LTE-A", 3GPP TSG RAN WG1 #57, San Francisco, USA, R1-091990, May 4-8, 2009, 5 Pages.
Alcatel-Lucent et al., "Design details for enhanced PDCCH", 3GPP Draft; R1-113322_Design Details for Enhanced PDCCH, 3rd Generation Partnership Project (3GPP), Mobile Competence Centre; 650, Route Des Lucioles; F-06921 Sophia-Antipolis Cedex ; France, vol. RAN WG1, no. Zhuhai; Oct. 10, 2011, Oct. 6, 2011 (Oct. 6, 2011), XP050538589, [retrieved on Oct. 6, 2011].
Catt: "Design of enhanced PDCCH in Rel-11", 3GPP Draft; R1-112119, 3rd Generation Partnership Project (3GPP), Mobile Competence Centre; 650, Route Des Lucioles ; F-06921 Sophia-Antipolis Cedex; France, vol. RAN WG1, no. Athens, Greece; Aug. 22, 2011, Aug. 16, 2011 (Aug. 16, 2011), XP050537293, [retrieved on Aug. 16, 2011].

Fujitsu, "Control Signaling Enhancements for DL-MIMO", 3GPP Draft; R1-113472_E_PDCCH, 3rd Generation Partnership Project (3GPP), Mobile Competence Centre ; 650, Route Des Lucioles ; F-06921 Sophia-Antipolis Cedex; France, vol. RAN WG1, no. Zhuhai; Oct. 10, 2011, Oct. 5, 2011 (Oct. 5, 2011), XP050538555, [retrieved on Oct. 5, 2011].
International Search Report and Written Opinion—PCT/US2012/063180—ISA/EPO—Mar. 14, 2013.
LG Electronics: "Consideration on common search space configuration for rel-11 UEs", 3GPP Draft; R1-113196 Configuration of CSS, 3rd Generation Partnership Project (3GPP), Mobile Competence Centre; 650, Route Des Lucioles; F-06921 Sophia-Antipolis Cedex; France, vol. RAN WG1. no. Zhuhai; Oct. 10, 2011, Oct. 4, 2011 (Oct. 4, 2011), XP050538318, [retrieved on Oct. 4, 2011].
LG Electronics, "Design aspects for enhanced PDCCH transmission", 3GPP Draft; R1-113193_LG_Design Aspects for Enhanced PDCCH Transmission, 3rd Generation Partnership Project (3GPP), Mobile Competence Centre; 650, Route Des Lucioles; F-06921 Sophia-Antipolis Cedex; France, vol. RAN WG1, no. Zhuhai; Oct. 10, 2011, Oct. 4, 2011 (Oct. 4, 2011), XP050538315, [retrieved on Oct. 4, 2011].
LG Electronics: "Discussion on DL/UL control channel for HARQ with ePDCCH", 3GPP Draft; R1-113197_LG_DLUL Control Channel for HARQ, 3rd-Generation Partnership Project (3GPP), Mobile Competence Centre; 650, Route Des Lucioles; F-06921 Sophia-Antipolis Cedex; France, vol. RAN WG1. no. Zhuhai; Oct. 10, 2011, Oct. 4, 2011 (Oct. 4, 2011), XP050538319, [retrieved on Oct. 4, 2011].
LG Electronics: "On ePDCCH Search Space Design Supporting Localized and Distributed Transmission", 3GPP Draft; R1-122309 ePDCCH SS_LG, 3rd Generation Partnership Project (3GPP), Mobile Competence Centre; 650, Route Des Lucioles ; F-06921 Sophia-Antipolis Cedex; France, vol. RAN WG1, no. Prague, Czech Republic; May 21, 2012-May 25, 2012, May 12, 2012 (May 12, 2012), XP050600572, [retrieved on May 12, 2012].
NTT Docomo: "Control channel ICIC for macro-femto deployments", 3GPP Draft; R1-106186 Macro-Femto ICIC, 3rd Generation Partnership Project (3GPP), Mobile Competence Centre; 650, Route Des Lucioles; F-06921 Sophia-Antipolis Cedex; France, vol. RAN WG1. no. Jacksonville, USA; Nov. 15, 2010, Nov. 9, 2010 (Nov. 9, 2010), XP050489636, [retrieved on Nov. 9, 2010].
Pantech, "PHICH resource allocation schemes for downlink CaMP scenario 4", 3GPP Draft; R1-113108 3rd Generation Partnership Project (3GPP), Mobile Competence Centr; 650, Route Des Lucioles ; F-06921 Sophia-Antipolis Cedex; France, vol. RAN WG1, no. Zhuhai; Oct. 10, 2011, Oct. 4, 2011 (Oct. 4, 2011), XP050538250, [retrieved on Oct. 4, 2011].
Partial International Search Report—PCT/US2012/063180—International Search Authority European Patent Office Jan. 30, 2013.
Qualcomm Incorporated: "e-PDCCH Requirements", 3GPP Draft; R1-113396 e-PDCCH, 3rd Generation Partnership Project (3GPP), Mobile Competence Centre; 650, Route Des Lucioles; F-06921 Sophia-Antipolis Cedex; France. vol. RAN WG1. no. Zhuhai; Oct. 10, 2011. Oct. 4, 2011 (Oct. 4, 2011). XP050538452, [retrieved on Oct. 4, 2011].
Research in Motion et al., "Design Consideration for e-PDCCH", 3GPP Draft; R1-113236(RIM-e-PDCCH Design), 3rd Generation Partnership Project (3GPP), Mobile Competence Centre; 650, Route Des Lucioles; F-06921 Sophia-Antipolis Cedex ; France, vol. RAN WG1, no. Zhuhai; Oct. 10, 2011, Oct. 4, 2011, XP050538352, [retrieved on Oct. 4, 2011].
Samsung: "Discussion on ePDCCH Design Issues", 3GPP Draft; R1-112517 ePDCCH, 3rd Generation Partnership Project (3GPP), Mobile Competence Centre ; 650, Route Des Lucioles ; F-06921 Sophia-Antipolis Cedex ; France, vol. RAN WG1, no. Athens, Greece; Aug. 22, 2011, Aug. 16, 2011, XP050537597, [retrieved on Aug. 16, 2011].
LG Electronics: "Aspects on DL and UL Control Channels for HARQ with Enhanced PDCCH", R1-113921, 3GPP, Nov. 9, 2011, pp. 4.
LG Electronics: "Enhancement of PHICH/PUCCH associated with E-PDCCH", R1-120455, 3GPP, Jan. 31, 2012, pp. 3.

(56) References Cited

OTHER PUBLICATIONS

LG Electronics: "Introduction of no PHICH monitoring operation", R1-124332, 3GPP, Sep. 29, 2012, pp. 2.
LG Electronics: "On PHICH monitoring of EPDCCH-configured UEs", R1-123535, 3GPP, Aug. 5, 2012, pp. 2.
LG Electronics: "On the Common Search Space for E-PDCCH-configured Ues", R1-120451, 3GPP, Jan. 31, 2012 ,pp. 3.
LG Electronics: "Principles of EPDCCH starting symbol configuration", 3GPP Draft; R1-124323, 3rd Generation Partnership Project (3GPP) , Mobile Competence Centre ; 650, Route Deslucioles; F-06921 Sophia-Antipolis Cedex ; France vol. RAN WG1, no. San Diego, USA; Oct. 8, 2012-Oct. 12, 2012, Sep. 29, 2012 (Sep. 29, 2012), XP050662221, pp. 1-4.
LG Electronics: "On the Common Search Space for E-PDCCH-configured Ues", R1-120451, 3GPP, Jan. 31 ,2012, pp. 3.
LG Electronics: "Principles of EPDCCH starting symbol configuration", 3GPP Draft; R1-124323, 3rd Generation Partnership Project (3GPP) , Mobile Competence Centre ; 650, Route Deslucioles; F-06921 Sophia-Antipolis Cedex ; France vol . RAN WG1, no. San Diego, USA; Oct. 8, 2012-Oct. 12, 2012, Sep. 29, 2012 (Sep. 29, 2012), XP050662221, pp. 1-4.
ETRI: "Discussions on Enhanced PDCCH in Rel-11," 3GPP TSG RAN WG1 #66bis, R1-113067 (Oct. 4, 2011), 4 pages.
Alcatel-Lucent Shanghai Bell: "Remaining Details of Search Space and Aggregation Levels, R1-124418," 3GPP, Sep. 29, 2012, 7 pages.
HTC: "Search Space Design for E-PDCCH," R1-120267, 3GPP, Feb. 1, 2012, 3 pages.
LG Electronics: "E-PDCCH Search Space Configuration," R1-121455, 3GPP, Mar. 20, 2012, 3 pages.
LG-Nortel, "R-PDCCH Multiplexing for LTE-A Relay Node," R1-103145, 3GPP, May 4, 2010, 6 pages.
NTT Docomo: "Views on the Scenario for DL Control Signaling Enhancement in Rel-11," R1-113287, 3GPP, Oct. 4, 2011, 4 pages.
Potevio: Considerations on Search Space Design for E-PDCCH, R1-120617, 3GPP, Jan. 31, 2012, 4 pages.
Qualcomm Incorporated: Remaining Details of Association between DM-RS Ports and EPDCCH Transmission, R1-124451, 3GPP, Sep. 29, 2012, 7 pages.
Fujitsu: "Motivation, Requirements and Design for ePHICH," 3GPP Draft; R1-121201 Motivation,Requirements and Design for Ephich, 3rd Generation Partnership Project (3GPP), Mobile Competence Centre ; 650, Route Des Lucioles ; F-06921 Sophia-Antipolis Cedex ; France, vol. RAN WG1, no. Jeju, Korea; Mar. 26, 2012-Mar. 30, 2012, Mar. 20, 2012 (Mar. 20, 2012), XP050599497, [retrieved on Mar. 20, 2012].
LG Electronics, et al., "Way Forward on EPDCCH Search Space Monitoring," R1-123933, 3GPP, Aug. 16, 2012, 2 Pages.
Research in Motion et al., "Other Control Channels for E-PDCCH,"3GPP Draft; R1-122724 (RIM—Other Control Channel), 3rd Generation Partnership Project (3GPP), Mobile Competence Centre ; 650, Route Des Lucioles ; F-06921 Sophia-Antipolis Cedex ; France, vol. RAN WG1, no. Prague, Czech Republic; May 21, 2012-May 25, 2012, May 12, 2012 (May 12, 2012), XP050600907, [retrieved on May 12, 2012].
Hisilicon, et al., "Search Space for R-PDCCH," 3GPP TSG-RAN WG1#62b R1-105146, 3GPP, Oct. 5, 2010, 5 pages.
Motorola Mobility: "Enhanced Control Channels for LTE Rel-11," 3GPP TSG-RAN WG1#66b R1-113261, 3GPP, Oct. 4, 2011, 4 pages.
Samsung: "PDCCH Extension for ICIC and Capacity Gains," 3GPP TSG-RAN WG 1#61 R1-103046, 3GPP, May, 4, 2010, 3 pages.
Nokia., et al., "Considerations on search spaces", 3GPP Draft, R1-123653, EPDCCH Search Space, 3rd Generation Partnership Project (3GPP), Mobile Competence Centre, 650, Route Des Lucioles, F-06921 Sophia-Antipolis Cedex, France, vol. RAN WG1, Qingdao, China; Aug. 13, 2012-Aug. 17, 2012 Aug. 6, 2012 (Aug. 6, 2012), XP050661693, Retrieved from the Internet: URL:http://www.3gpp.org/ftp/tsg_ran/WG1_RL1/TSGR1_70/Docs/ [retrieved on Aug. 6, 2012], 7 pages.
Research in Motion., et al., "On Remaining Issues in E-PDCCH Search Space Design", 3GPP Draft, R1-124245, (RIM-EPDCCH Searching Space), 3rd Generation Partnership Project (3GPP), Mobile Competence Centre, 650, Route Des Lucioles, F-06921, Sophia-Antipolis Cedex, France, RAN WG1, San Diego, USA, Oct. 8, 2012-Oct. 12, 2012 Sep. 29, 2012 (Sep. 29, 2012), XP050662152, Retrieved from the Internet: URL: http://www.3gpp.org/ftp/tsg_ran/WG1_RL1/TSGR1_70b/Docs/ [retrieved on Sep. 29, 2012], 7 pages.
Nokia., et al., "eREG/eCCE Definition for ePDCCH", 3GPP Draft, R1-123650, 3rd Generation Partnership Project (3GPP), Mobile Competence Centre, 650, Route Des Lucioles, F-06921, Sophia-Antipolis Cedex, France, Ran WG1, Qingdao, China, Aug. 13, 2012-Aug. 17, 2012 Aug. 5, 2012 (Aug. 5, 2012), XP050661526, Retrieved from the Internet: URL: http://www.3gpp.org/ftp/tsg_ran/WG1_RL1/TSGR1_70/Docs/ [retrieved on Aug. 5, 2012], 6 pages.
New Postcom: "CSS Requirements on ePDCCH", 3GPP TSG-RANWG1 #70, R1-123361, Aug. 5, 2012, 3 Pages.

\* cited by examiner

SEARCH SPACE DESIGN FOR E-PDCCH IN WIRELESS COMMUNICATION NETWORKS

CROSS-REFERENCE TO RELATED APPLICATION

This application claims priority to U.S. Provisional Application Ser. No. 61/556,144, filed on Nov. 4, 2011, and 61/707,494, filed on Sep. 28, 2012, which are expressly incorporated by reference herein in their entirety.

BACKGROUND

Field

Aspects of the present disclosure relate generally to wireless communication systems, and more particularly, to techniques for designing a search space for a physical downlink control channel (PDCCH).

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications by a user equipment (UE). The method generally includes receiving a configuration for an enhanced physical downlink control channel (e-PDCCH), and determining whether or not to monitor a first type of physical hybrid ARQ indicator channel (PHICH) in a subframe based on the configuration.

Certain aspects of the present disclosure provide an apparatus for wireless communications by a UE. The apparatus generally includes means for receiving a configuration for an e-PDCCH, and means for determining whether or not to monitor a first type of PHICH in a subframe based on the configuration.

Certain aspects of the present disclosure provide an apparatus for wireless communications by a UE. The apparatus generally includes at least one processor and a memory coupled to the at least one processor. The at least one processor is generally configured to receive a configuration for an e-PDCCH, and determine whether or not to monitor a first type of PHICH in a subframe based on the configuration.

Certain aspects of the present disclosure provide a computer-program product for wireless communications by a UE. The computer-program product generally includes a computer-readable medium having code for receiving a configuration for an e-PDCCH, and determining whether or not to monitor a first type of PHICH in a subframe based on the configuration.

Certain aspects of the present disclosure provide a method for wireless communications. The method generally includes determining a common search space comprising a set of resource elements (REs) located on a band edge of available frequency resources, and performing a search of the common search space to decode at least one e-PDCCH.

Certain aspects of the present disclosure provide an apparatus for wireless communications. The apparatus generally includes means for determining a common search space comprising a set of REs located on a band edge of available frequency resources, and means for performing a search of the common search space to decode at least one e-PDCCH.

Certain aspects of the present disclosure provide an apparatus for wireless communications. The apparatus generally includes at least one processor and a memory coupled to the at least one processor. The at least one processor is generally configured to determine a common search space comprising a set of REs located on a band edge of available frequency resources, and perform a search of the common search space to decode at least one e-PDCCH.

Certain aspects of the present disclosure provide a computer-program product for wireless communications. The computer-program product generally includes a computer-readable medium having code for determining a common search space comprising a set of REs located on a band edge of available frequency resources, and performing a search of the common search space to decode at least one e-PDCCH.

Certain aspects of the present disclosure provide a method for wireless communications by a UE. The method generally includes receiving a configuration for an e-PDCCH, determining a set of enhanced control channel elements (eCCEs) for the e-PDCCH, determining a search space based on the set of eCCEs, and performing a search of the search space to decode at least one e-PDCCH.

Certain aspects of the present disclosure provide an apparatus for wireless communications by a UE. The apparatus generally includes means for receiving a configuration for an e-PDCCH, means for determining a set of eCCEs for the e-PDCCH, means for determining a search space based on the set of eCCEs, and means for performing a search of the search space to decode at least one e-PDCCH.

Certain aspects of the present disclosure provide an apparatus for wireless communications by a UE. The apparatus generally includes at least one processor and a memory coupled to the at least one processor. The at least one processor is generally configured to receive a configuration for an e-PDCCH, determine a set of eCCEs for the e-PDCCH, determine a search space based on the set of eCCEs, and perform a search of the search space to decode at least one e-PDCCH.

Certain aspects of the present disclosure provide a computer-program product for wireless communications by a UE. The computer-program product generally includes a computer-readable medium having code for receiving a configuration for an e-PDCCH, determining a set of eCCEs for the e-PDCCH, determining a search space based on the set of eCCEs, and performing a search of the search space to decode at least one e-PDCCH.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
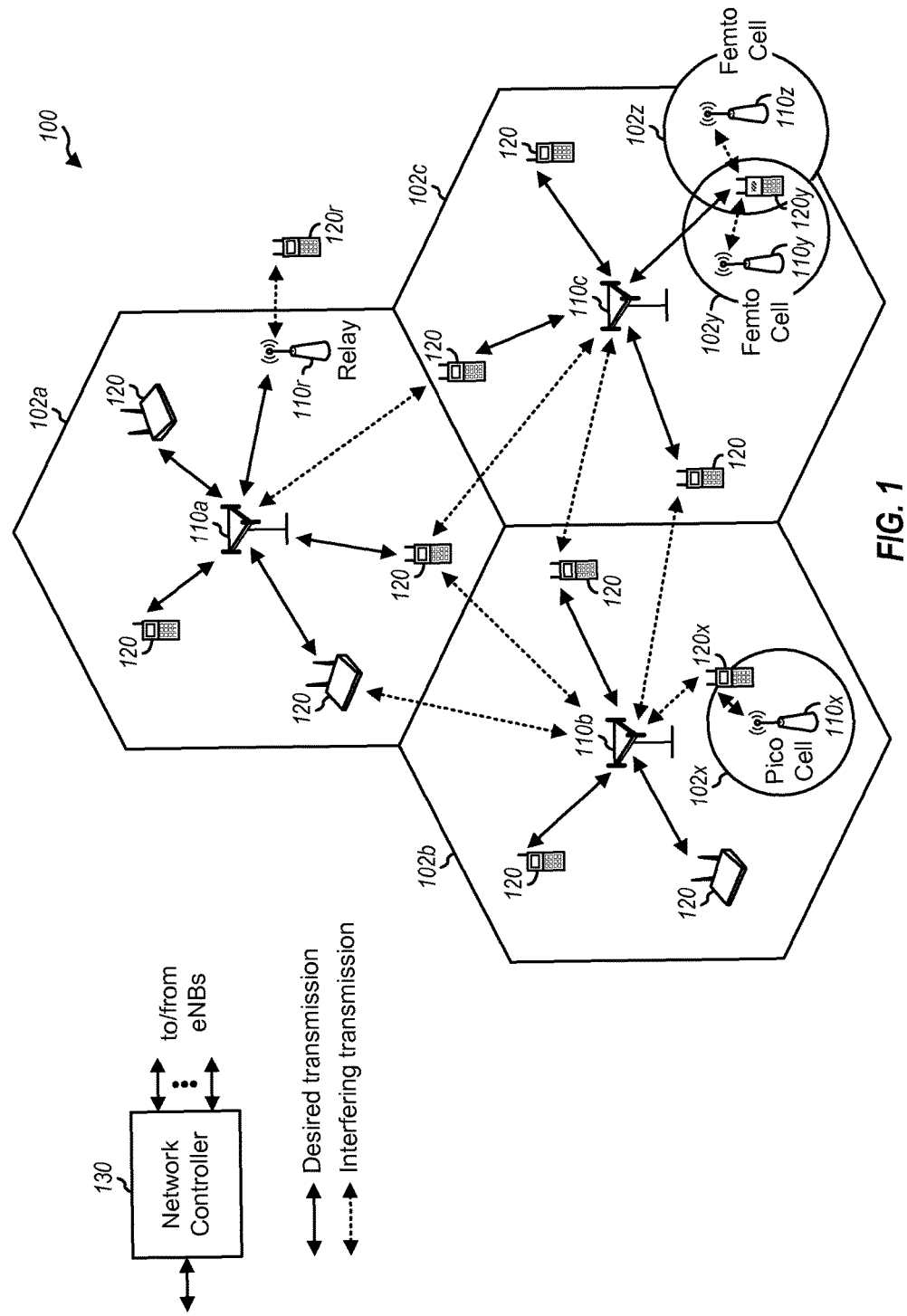
FIG. 1 is a block diagram conceptually illustrating an example of a telecommunications system, in accordance with aspects of the present disclosure.

FIG. 1 shows a wireless communication network 100, which may be an LTE network. The wireless network 100 may include a number of evolved Node Bs (eNodeBs) 110 and other network entities. An eNodeB may be a station that communicates with the UEs 120 and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB 110 and/or an eNodeB subsystem serving this coverage area, depending on the context in which the term is used.

An eNodeB may provide communication coverage for a macro cell 102a, 102b, 102c, a pico cell 102x, a femto cell 102y, 102z, and/or other types of cell. A macro cell 102a may cover a relatively large geographic area (e.g., several kilometers in radius) and may allow unrestricted access by UEs 120 with service subscription. A pico cell 102x may cover a relatively small geographic area and may allow unrestricted access by UEs 120 with service subscription. A femto cell 102y, 102z may cover a relatively small geographic area (e.g., a home) and may allow restricted access by UEs 120 having association with the femto cell 102y, 102z (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b, and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs 110 and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 2:
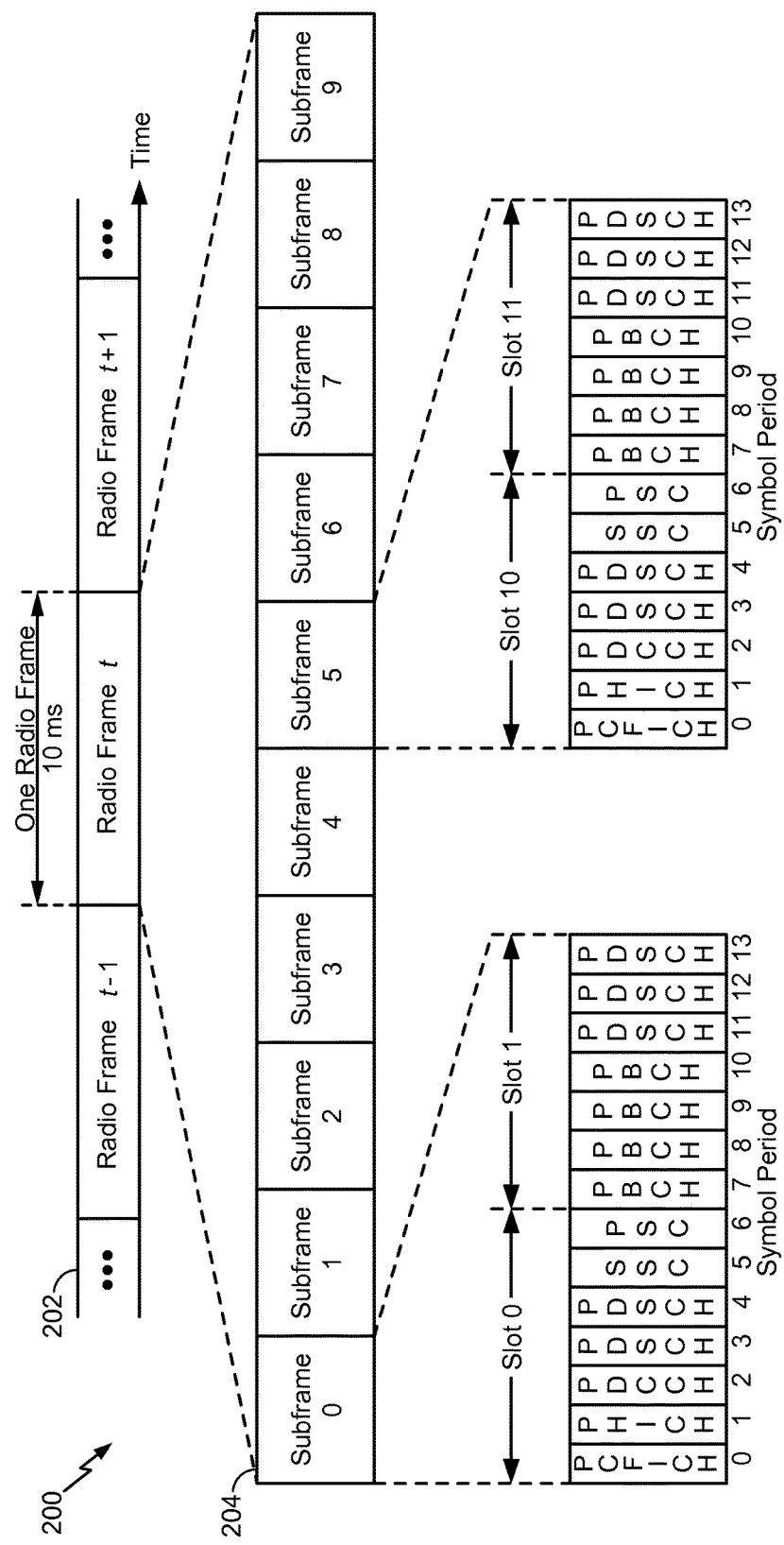
FIG. 2 is a block diagram conceptually illustrating an example of a downlink frame structure in a telecommunications system, in accordance with aspects of the present disclosure.

FIG. 2 shows a downlink frame structure 200 used in LTE. The transmission timeline for the downlink may be partitioned into units of radio frames 202. Each radio frame may have a predetermined duration (e.g., 10 milliseconds (ms)) and may be partitioned into 10 subframes 204 with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
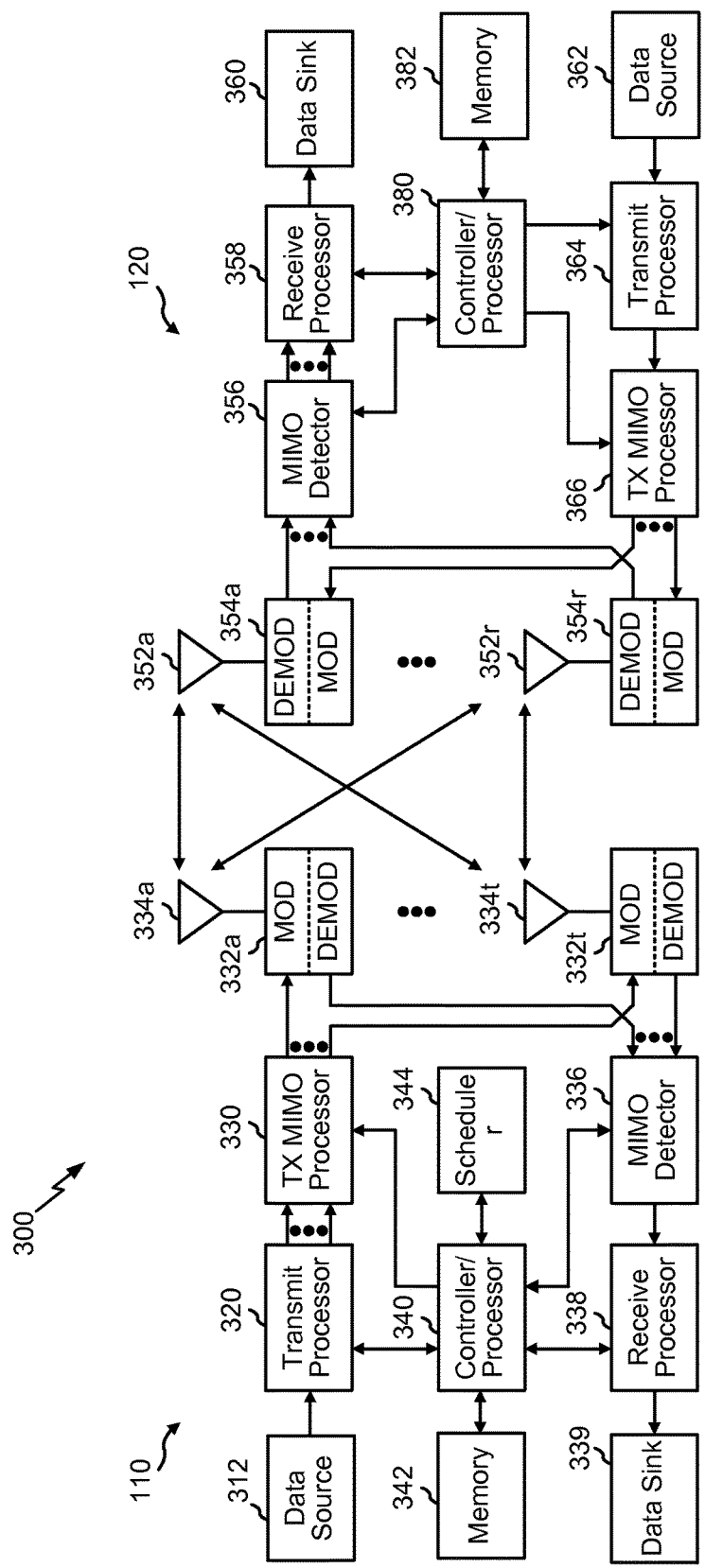
FIG. 3 is a block diagram conceptually illustrating a design of a base station/eNodeB and a UE configured, in accordance with aspects of the present disclosure.

FIG. 3 shows a block diagram 300 of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 9-11, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Carrier Aggregation

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

To meet LTE-Advanced requirements, support of transmission bandwidths wider than the 20 MHz is required. One solution is carrier aggregation. Carrier aggregation allows expansion of effective bandwidth delivered to a UE 120 through concurrent utilization of radio resources across multiple carriers. Multiple component carriers are aggregated to form a larger overall transmission bandwidth.

Carrier Aggregation Types

Figure 4A:
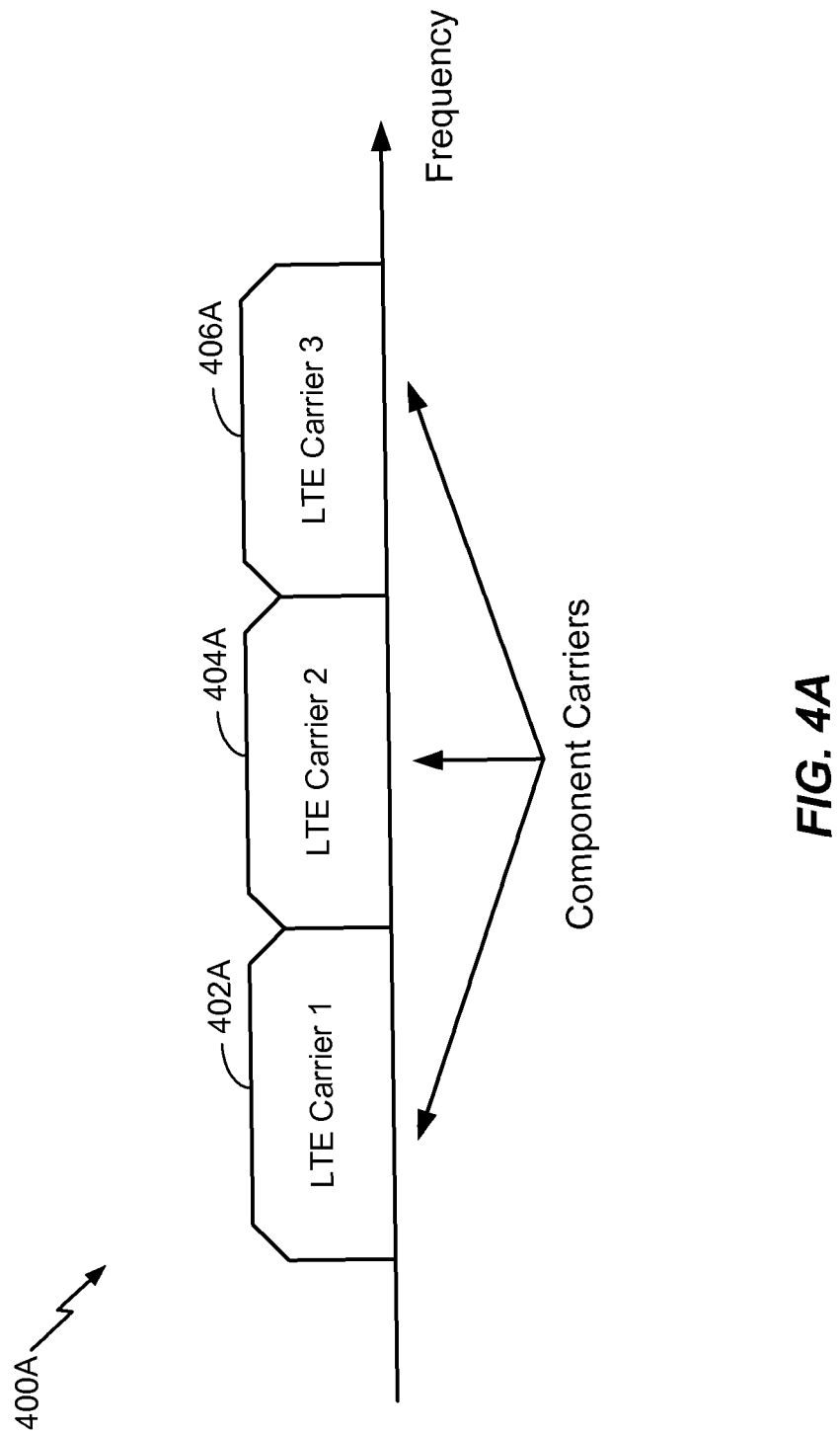
FIG. 4A illustrates a continuous carrier aggregation type, in accordance with aspects of the present disclosure.
Figure 4B:
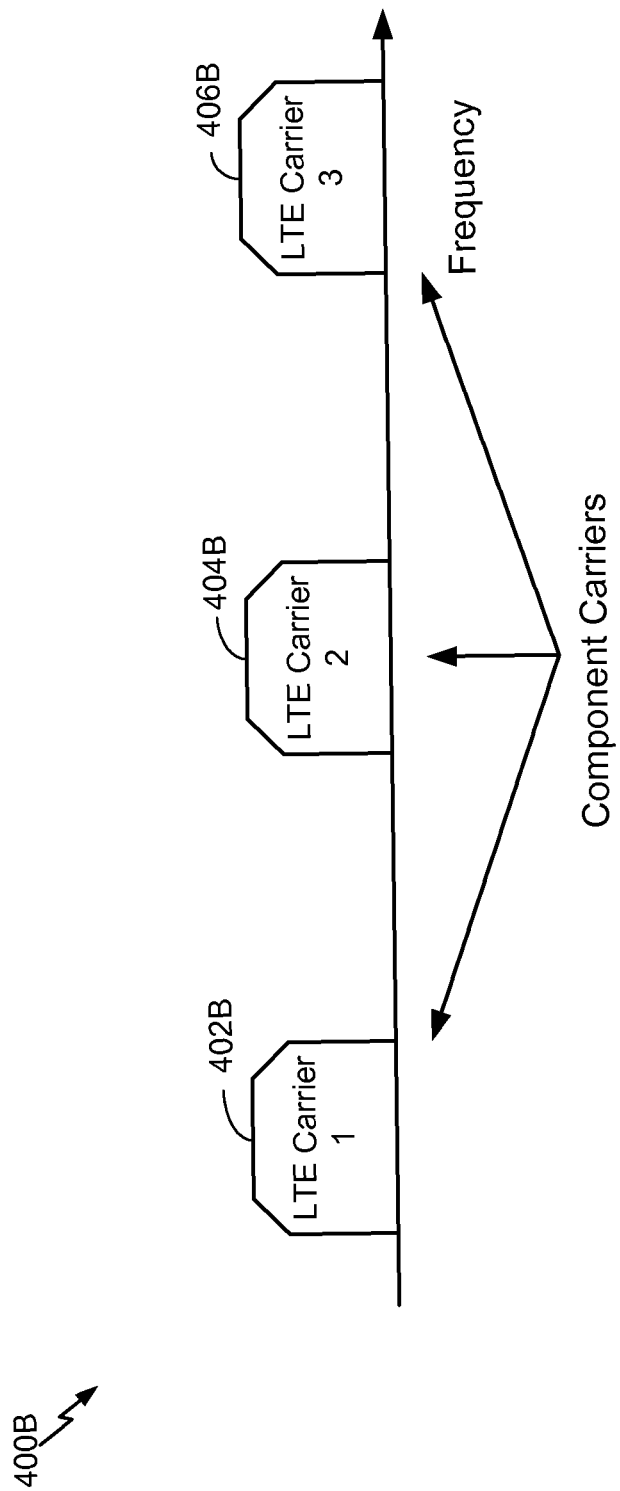
FIG. 4B illustrates a non-continuous carrier aggregation type, in accordance with aspects of the present disclosure.

For LTE-Advanced mobile systems, two types of carrier aggregation (CA) methods have been proposed, continuous CA and non-continuous CA, which are illustrated in FIGS. 4A and 4B.

FIG. 4A illustrates an example of continuous CA 400A, according to aspects of the present disclosure. Continuous CA occurs when multiple available component carriers 402A, 404A, and 406A are adjacent to each other, as illustrated in FIG. 4A.

FIG. 4B illustrates an example of non-continuous CA 400B, according to aspects of the present disclosure. Non-continuous CA occurs when multiple available component carriers 402B, 404B, and 406B are separated along the frequency band, as illustrated in FIG. 4B. Both non-continuous and continuous CA aggregates multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the eNodeB has fixed transmitting power on each component carrier, the effective coverage or supportable modulation and coding of each component carrier may be different.

Data Aggregation Schemes

Figure 5:
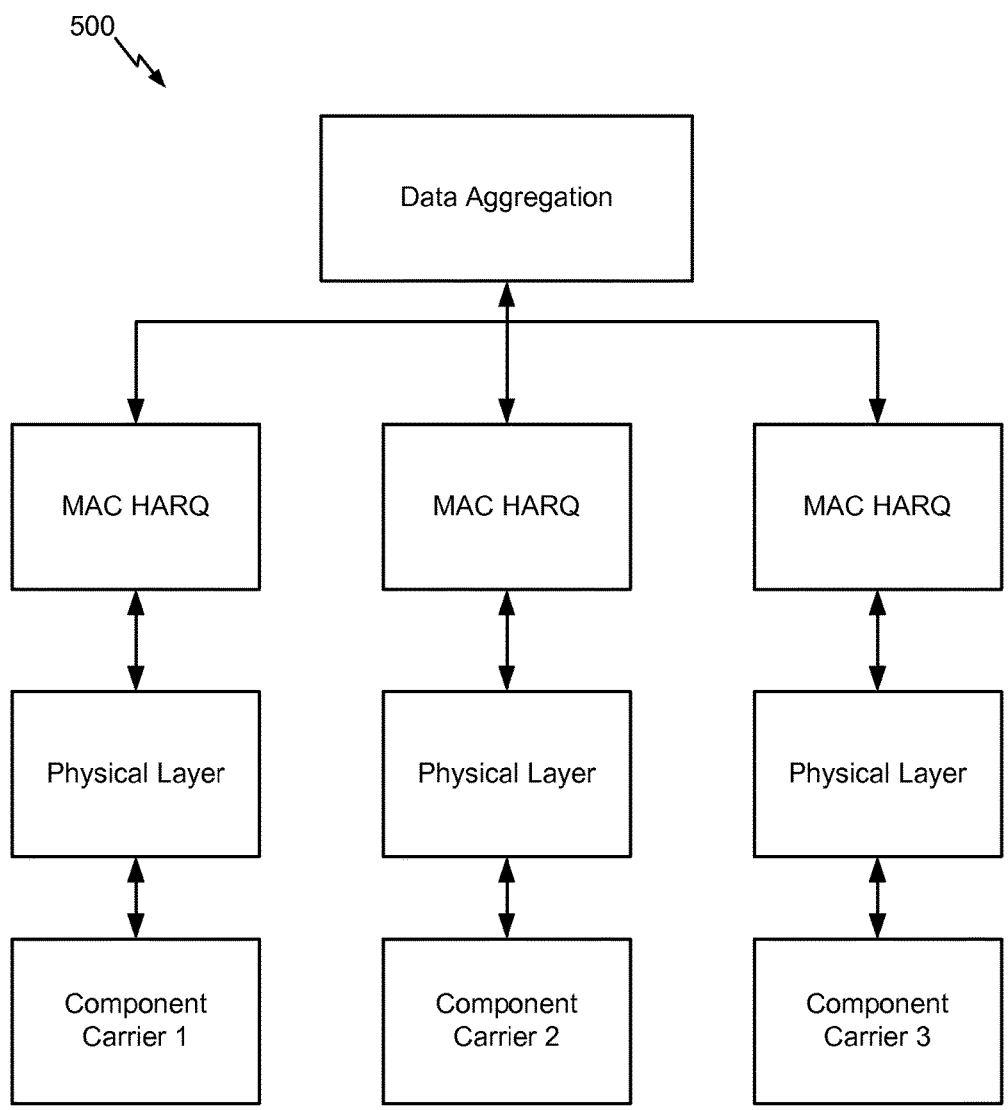
FIG. 5 illustrates MAC layer data aggregation, in accordance with aspects of the present disclosure.

FIG. 5 illustrates aggregating transmission blocks (TBs) 500 from different component carriers at the medium access control (MAC) layer for an IMT-Advanced system, in accordance with aspects of the present disclosure. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers.

The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

The third method involves jointly coding multiple control channels for different component carriers and then transmitting over the entire frequency band. This approach offers low signaling overhead and high decoding performance in control channels, at the expense of high power consumption at the UE side. However, this method is not compatible with LTE systems.

Handover Control

Handover occurs when a UE 120 moves from one cell 102, covered by a first eNodeB 110, into another cell 102 covered by a second eNodeB. It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNodeB to the UE, and on the uplink by the UE to the eNodeB.

In some embodiments, there may be multiple primary carriers. In addition, secondary carriers may be added or removed without affecting the basic operation of the UE, including physical channel establishment and radio link failure (RLF) procedures which are layer 2 procedures, such as in the 3GPP technical specification 36.331 for the LTE RRC protocol.

Figure 6:
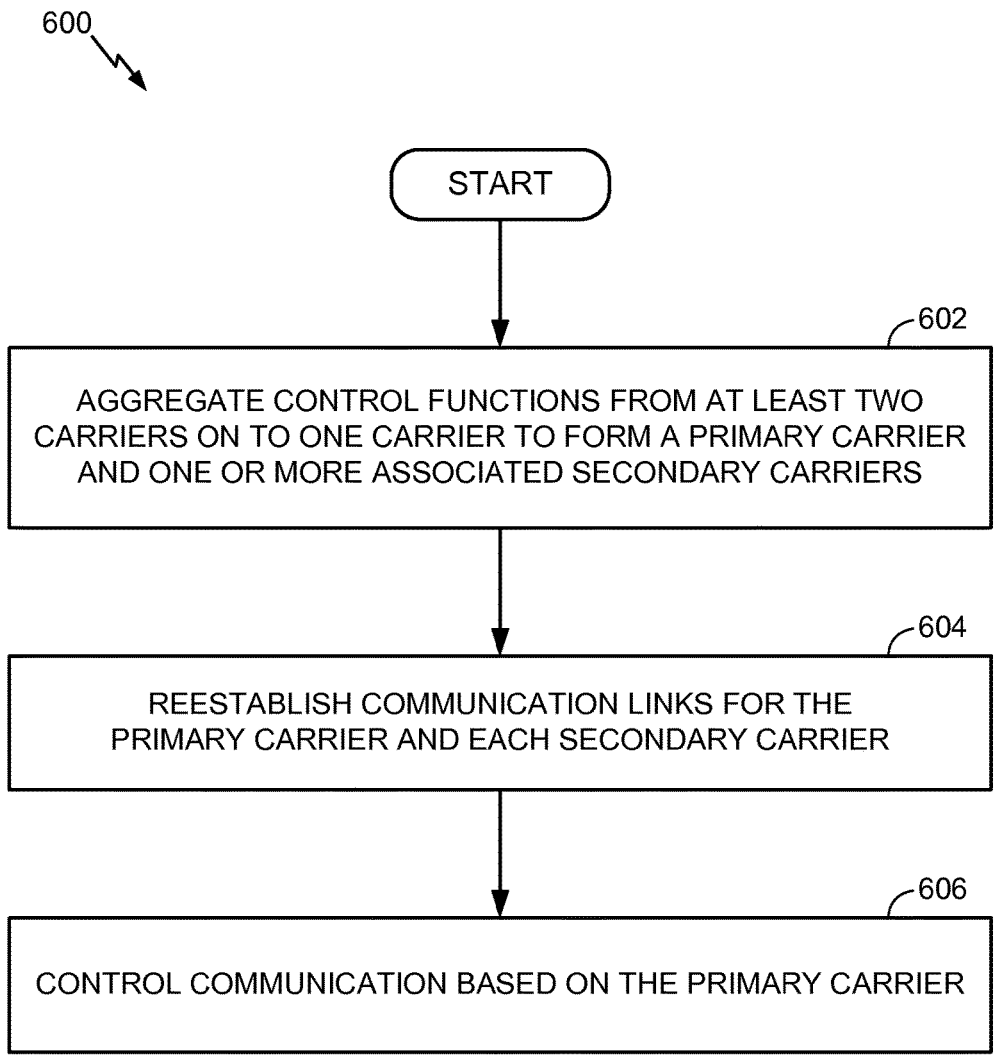
FIG. 6 is a block diagram illustrating a method for controlling radio links in multiple carrier configurations, in accordance with aspects of the present disclosure.

FIG. 6 illustrates a method 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next, at block 604, communication links are established for the primary carrier and each secondary carrier. Then, communication is controlled based on the primary carrier at block 606.

Search Space

In Long Term Evolution (LTE) Release-8, each user equipment (UE) may monitor both a common search space and a UE-specific search space in a control region. A search space may comprise a set of channel control element (CCE) locations where a UE may find its PDCCHs. One or more CCEs are used to transmit each PDCCH. All UEs are aware of the common search space, while the dedicated search space is configured for an individual UE. The maximum number of PDCCH candidates that a UE may attempt to decode in a subframe is listed in Table 1. The PDCCH candidates are transmitted using a number of the CCEs. Nine sets of four physical resource elements (REs) known as resource element groups (REGs) make up each CCE. Thus, one CCE equals 36 REs. Each search space is further classified into PDCCH aggregation levels for different protection of the control channel transmission. The number of CCEs used for a PDCCH may be 1, 2, 4, or 8. Each search space comprises a group of consecutive CCEs which could be allocated to a PDCCH called a PDCCH candidate. For each aggregation level, each UE has to try to decode more than one possible candidate. The CCE aggregation level determines the number of PDCCH candidates in a search space and is given by the PDCCH format. Table 1 gives the number of candidates and size of the search space for each aggregation level.

TABLE 1

| TYPE | Aggregation Level | Size in CCEs | Number of PDCCH Candidates |
| --- | --- | --- | --- |
| UE-Specific | 1 | 6 | 6 |
| UE-Specific | 2 | 12 | 6 |
| UE-Specific | 4 | 8 | 2 |

TABLE 1-continued

| TYPE | Aggregation Level | Size in CCEs | Number of PDCCH Candidates |
|---|---|---|---|
| UE-Specific | 8 | 16 | 2 |
| Common | 4 | 16 | 4 |
| Common | 8 | 16 | 2 |

It can be observed in Table 1 that that there may be up to six PDCCH candidates in the common search space (i.e., four for control channel element (CCE) aggregation level 4, and two for aggregation level 8), and up to 16 candidates in the UE-specific search space (i.e., six for aggregation level 1, six for aggregation level 2, two for aggregation level 4, and two for aggregation level 8). It can be observed from Table 1 that a number of CCEs to be searched within each PDCCH candidate of a plurality of PDCCH candidates may depend on the aggregation level. Thus, there are 4 PDCCH candidates for common aggregation level 4 and 2 PDCCH candidates for common aggregation level 8 even though both are sixteen CCEs in size. To find its PDCCH, the UE monitors a set of PDCCH candidates in every subframe. In Rel-8, each candidate may carry up to two downlink control information (DCI) sizes. As a result, the total number of blind decodes for a UE is up to (4+2)*2+(6+6+2+2)*2=44 in any subframe. In Rel-10, due to the introduction of UL MIMO, in the UE-specific search spaces, each candidate may carry up to three downlink control information (DCI) sizes, leading to the total number of blind decodes for a UE up to (4+2)*2+(6+6+2+2)*3=60 in any subframe. Note that the search spaces among common and UE-specific, and for different aggregation levels might overlap. This overlap, if such occurs, limits the possibility of scheduling a UE due to potential collision with other UEs. LTE-A offers the opportunity for a UE to monitor multiple carriers at the same time. In this case, it is desirable to limit the total number of blind decodes, e.g., still 44 (or higher but limited) comparing to the single-carrier operation.

Many motivations exist for an enhanced physical downlink control channel (e-PDCCH). For example, e-PDCCH may provide carrier aggregation (CA) enhancements, help support new carriers which may not be backwards compatible, reduce control channel capacity limitations of coordinated multipoint (CoMP) transmissions, and enhance DL MIMO.

According to aspects of the present disclosure, an e-PDCCH may support increased control channel capacity and frequency-domain Inter Cell Interference Coordination (ICIC). e-PDCCH may achieve improved spatial reuse of control channel resources. As well, the e-PDCCH may support beamforming and/or diversity, operate on new carrier types and in Multicast-Broadcast Single Frequency Network (MBSFN) subframes, and may coexist on the same carrier as legacy UEs. The e-PDCCH may be scheduled in a frequency-selective manner and may mitigate inter-cell interference.

Figure 7:
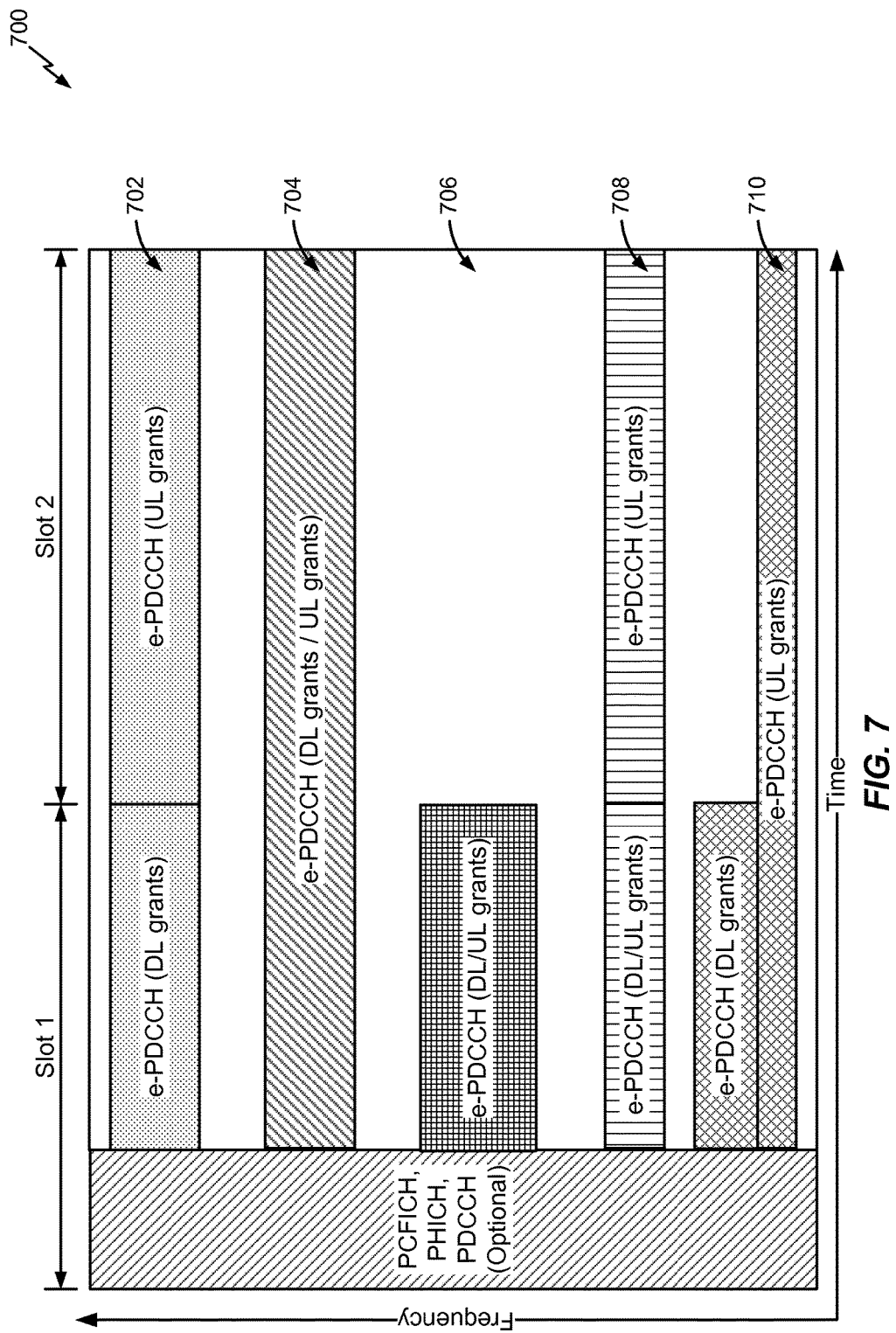
FIG. 7 illustrates possible structures for transmission of e-PDCCH, in accordance with aspects of the present disclosure.

FIG. 7 illustrates possible structures for e-PDCCH 700, according to aspects of the present disclosure. As will be described in more detail below, aspects presented herein provide various schemes for e-PDCCH placement, including: placement similar to relay PDCCH (R-PDCCH), a pure-frequency division multiplexing (FDM) scheme, a time division multiplexing (TDM) scheme, placement similar to a R-PDCCH (e.g., R-PDCCH-like scheme, with e-PDCCH DL in a first slot and e-PDCCH UL in either the first or second slot), and a hybrid TDM and FDM scheme.

According to a first alternative, 702, the e-PDCCH may be transmitted similarly to transmission of the R-PDCCH, wherein DL grants may be transmitted in a first slot and UL grants may be transmitted in a second slot. According to aspects, the second slot may be used for downlink data transmission if the second slot is not being used for the transmission of uplink grants.

According to a second alternative, 704, the e-PDCCH may be transmitted in a pure FDM scheme, wherein DL grants and UL grants span the resource block (RB). As shown, a set of resources in the frequency domain are allocated for transmission of e-PDCCH across a time domain comprising a first time slot and a second time slot. According to certain aspects, a subset of RBs multiplexed in the frequency domain with PDSCH are allocated for transmitting e-PDCCH including both uplink and downlink grants across the first and second time slots.

According to a third alternative, 706, the e-PDCCH may be transmitted in a first slot according to a TDM scheme, wherein DL and UL grants are transmitted in a first slot. As illustrated, the remaining RBs may be utilized for transmitting the PDSCH data transmissions.

According to a fourth alternative, 708, the e-PDCCH may be transmitted in a manner similar to R-PDCCH, wherein DL and UL grants may be transmitted in a first slot and UL grants may be transmitted in a second slot. According to certain aspects, if a DL grant is transmitted in a first PRB of a given PRB pair, then an UL grant may be transmitted in a second PRB of the PRB pair. Otherwise, an UL grant may be transmitted in either the first or second PRB of the PRB pair.

According to a fifth alternative, 710, the e-PDCCH may be transmitted using TDM for DL grants in a first slot and FDM for UL grants spanning a first and second slot.

Search Space Design for e-PDCCH in LTE

A search space may comprise a set of CCE locations where a UE may find its PDCCHs. In a search space design for e-PDCCH, a form of PHICH may or may not be required. Referring to relay stations, there may be no R-PHICH in Rel-10 due to the fact that there may be only a limited number of relay nodes and the backhaul channel may be static such that better H-ARQ management may be possible compared with UEs. In addition, PDCCH may replace PHICH, although with much higher overhead. However, the number of UEs addressed by e-PDCCH is not limited, so a form of PHICH (e.g., enhanced PHICH) may be required. For some embodiments, the traditional PHICH (legacy PHICH) may be used for acknowledging whether an eNB has correctly received a transmission on a PUSCH. However, utilizing the legacy PHICH may not address some scenarios, for example, scenarios dealing with heterogeneous networks (HetNets) or new carrier types (e.g., if no anchor carrier). For some embodiments, a new e-PHICH may be designed in the data region, possibly multiplexing with e-PDCCH. For some embodiments, no PHICH and e-PHICH may be used for the UE. However, this may lead to inefficient UL scheduling (e.g., excessive DL control overhead).

For some embodiments, a UE may be configured with one of two modes since PHICH may be available for some UEs and some scenarios and may not be available for other scenarios. For example, a UE may be configured to use the legacy PHICH, and may also be configured without PHICH for all subframes or for some subframes (e.g., non-ABS subframes). Such a configuration can be UE-specific. As another example, a UE may be configured to use the legacy PHICH, and may also be configured with e-PHICH.

Design of e-PHICH may be based on resource element groups (REG). For example, one REG may be allowed to span two or more symbols in the same RB. For some embodiments, e-PHICH may be jointly designed with a common search space for e-PDCCH (similar to the legacy PHICH+PDCCH design). For example, the set of RBs reserved may be similar to those of PUCCH (e.g., located on the band edge for maximum frequency diversity).

In a search space design for e-PDCCH, a common search space may or may not be required. A common search space may be necessary for standalone extension carriers in future releases, possibly with different aggregation levels from those defined for legacy common search space, and possibly only in a subset of subframes. If common search space is enabled, an eNB may have to ensure that at least for some signaling (e.g., SIBs), legacy PDCCH and e-PDCCH both point to the same PDSCH assignments. Otherwise, there may be double PDSCH assignments for broadcast, which may be a waste. As discussed earlier, the support of PHICH and common search space may be combined. The location of the common search space may be broadcast or unicast (e.g., can be located on the band edge, similar to PUCCH).

In a UE-specific search space for e-PDCCH, a hashing function may or may not be required. Referring to relay stations, R-PDCCH may not have a hashing function (e.g., due to limited number of relays). Therefore, the starting PRB index for different aggregation levels may be purely by RRC configuration. However, with regards to e-PDCCH, the hashing function may seem necessary to support a large number of UEs (especially for extension carriers). The search space may be subframe and UE ID dependent as in the legacy PDCCH case.

In a search space for e-PDCCH, a pseudo-random mapping function may be introduced to map from a set physical resources (e.g., in units of enhanced control channel element, or eCCE) to a set of logical resources. With such a pseudo-random mapping function, the set of decoding candidates for e-PDCCH for an aggregation level can be logically contiguous, but may not necessarily be physically contiguous. In one example, some restrictions can be applied to the pseudo-random mapping function. As an example, one restriction may be that the mapping should be such that a tree structure for the search space is still kept. In one example, the mapping function is applicable to e-PDCCH of a localized type.

Depending on the e-PDCCH structure, aggregation levels and the number of decoding candidates may vary. For a TDM-based e-PDCCH, one resource block (RB) may be roughly comparable to one CCE (36 REs) and, hence, support aggregation levels 1, 2, 4, and 8. For an FDM-based e-PDCCH, one RB may roughly double or triple the CCE size and, hence, may only support aggregation levels 1, 2, and 4. However, if the 4-tone (or other values) based PRB pair is introduced, levels 1, 2, 4, and 8 may be supported. As an example, if the fifth alternative 710 for e-PDCCH structure is adopted, for DL grants (TDM-based), levels 1, 2, 4 and 8 may be supported, and for UL grants (FDM-based), levels 1, 2, and 8 may be supported. Generally, it may be desirable to keep the same number of decoding candidates per UE for desirable scheduling flexibility. The number of decoding candidates may be split between legacy PDCCH and e-PDCCH, if both are configured in a subframe. For FDM-based e-PDCCH, it may be desirable to limit it for early decoding benefits.

In Rel-8/9/10, a UE may be RRC-configured a DL transmission mode and an UL transmission mode (only in Rel-10). For each DL mode, there may be two DCI formats 1A+mode-dependent format (1/1B/1D/2/2A/2B/2C). For UL MIMO mode, there may also be two DCI formats 0+4. For e-PDCCH, for standalone extension carrier case and/or HetNets, there may be no strong need to remove the compact DCI formats (0 & 1A) (for improved DL overhead, especially for cell-edge UEs).

Blind decodes may be split between a legacy PDCCH and an e-PDCCH for a UE for a reduced number of blind decodes of e-PDCCH and early decoding benefits. Blind decodes may be split in various ways. For example there may be a split of search spaces (e.g., common search space on a legacy PDCCH and a UE-specific search space on e-PDCCH). As another example, there may be a split of decoding candidates for an aggregation level. For example, for the six decoding candidates of aggregation level 1, three candidates in legacy PDCCH and three candidates in e-PDCCH. For some embodiments, there may be a split of aggregation levels (e.g., level 4 and 8 in legacy PDCCH, and level 1 and 2 in e-PDCCH). For some embodiments, there may be a split of DCI formats (e.g., DCI format such that 0/1A in legacy PDCCH, and mode-dependent DL DCI format and format 4 in e-PDCCH). However, DCI format 0 may be considered in e-PDCCH, for example, by configuration either in legacy or in the new region. DCI formats 1C/3/3A may be tied with the support of common search space, so if common search space is not supported, these DCI formats may not be supported. Semi-persistent scheduling can supported by e-PDCCH. Random access response grant can also be scheduled by e-PDCCH. The maximum number of blind decodes per UE per subframe per CC is expected to be the same as or similar to in Rel-10.

In one embodiment, a UE may be configured with one or more e-PDCCH resource sets, each set with a size individually configured. In order to maintain the same number of blind decodes, the number of decoding candidates may have to be split between different e-PDCCH resource sets. In another example, a UE may be configured to monitor both localized and distributed e-PDCCH in a same subframe. In order to maintain the same number of blind decodes, the number of decoding candidates may have to be split between localized and distributed e-PDCCH. In one example, the split can be specified via a RRC configuration, where a UE is provided an indication of the detailed split of e-PDCCH decoding candidates between different e-PDCCH sets and/or localized and distributed e-PDCCH. The indication of the split can be done for each aggregation level.

As an example, with 2 e-PDCCH sets, one for localized and one for distributed, a UE can be indicated such that for set 1 of localized e-PDCCH, there are 3 decoding candidates for level 1, 3 decoding candidates for level 2, 1 decoding candidate for level 4, and 1 decoding candidate for level 8, while for set 2 of distributed e-PDCCH, there are 3 decoding candidates for level 1, 3 decoding candidates for level 2, 1 decoding candidate for level 4, and 1 decoding candidate for level 8. In one example, some restrictions may be enforced with regard to the RRC configured split, since a fully flexible configured split may not be necessary, but may have complexity and performance implications.

As an example of such a restriction, a minimum number of decoding candidates may be specified for each e-PDCCH set. For instance, assuming the total number of decoding candidates is {6, 6, 2, 2} for levels {1, 2, 4, 8}, possible splits include: for level 1, (0,6), (2,4), (4,2), and (6,0) (i.e., the allocation granularity is 2 candidates); for level 2, same possible splits as level 1 (but independent configuration); for level 4, (2,0), (1,1), (0,2), i.e., all possibilities; for level 8, (2,0), (1,1), (0,2), i.e., all possibilities. A total of zero number of decoding candidates in a set is not allowed. The above combinations can be signaled using 5 bits. It can also be extended to other cases, for example, when the possible aggregation levels include {1, 2, 4, 8, 16}, {2, 4, 8, 16}, or {2, 4, 8, 16, 32) associated with a total number decoding candidates specified for each aggregation level. Note that the motivation here may not be to save some bits in RRC configuration, but to avoid excessive number of combinations in RRC configuration.

Alternatively, some specific rules can be defined without any RRC signaling. As an example, assuming the number of decoding candidates is {6, 6, 2, 2} for aggregation levels {1, 2, 4, 8}, respectively, and 2 e-PDCCH sets of N1 and N2 PRB pairs, respectively. The number of decoding candidates for e-PDCCH set 1 and e-PDCCH set 2 can be determined such that for e-PDCCH set 1, the number of decoding candidates is given by round(N1/(N1+N2)*{6, 6, 2, 2}) for levels {1, 2, 4, 8}, respectively, while for e-PDCCH set 2, the number of decoding candidates is given by {6, 6, 2, 2}–round(N1/(N1+N2)*{6, 6, 2, 2}) for levels {1, 2, 4, 8}, respectively. These rules may take into account the size of each set, the frequency diversity level of each set, etc. The round(.) operation may also be replaced by a ceiling(.) or a floor(.) operation. A minimum number of decoding candidates, possibly specified on a per aggregation level basis (i.e., the minimum value may be differently specified for each aggregation level), may also be enforced in addition to the above rules such that for a given e-PDCCH resource set, there is a minimum number of decoding candidates for a given aggregation level. The rule based split is reasonable especially when the two sets are of the same type (localized or distributed). However, it may be a bit restrictive when one set is localized and the other set is distributed. As a result, when two or more e-PDCCH sets are of the same type, the split of e-PDCCH decoding candidates can be based on a predefined rule. When two or more e-PDCCH sets are of different types, the split of e-PDCCH decoding candidates can be based on a RRC configuration, subject to certain restrictions. Alternatively, RRC configuration may always be used, but with some restriction in the possible combinations of split of decoding candidates among different e-PDCCH resource sets.

Figure 8:
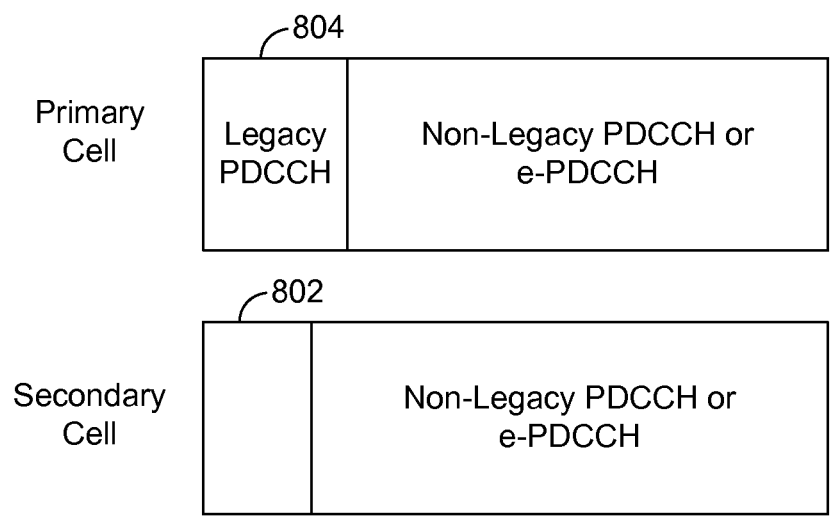
FIG. 8 provides an illustration of component carriers (CCs) of a UE operating in a multicarrier system (also referred to as carrier aggregation), in accordance with aspects of the present disclosure.

FIG. 8 provides an illustration of component carriers (CCs) of a UE operating in a multicarrier system (also referred to as carrier aggregation), according to aspects of the present disclosure. With respect to carrier aggregation (CA), e-PDCCH may be configured on a subset of CCs as part of CA for a UE. However, for those CCs with e-PDCCH, there may be no cross-carrier scheduling for e-PDCCH, but there may still be cross-carrier scheduling for a legacy PDCCH.

For some embodiments, for the secondary CC, there may be no legacy PDCCH for the UE (on the same CC or another CC), as illustrated by area 802 in the secondary Cell. This may be relevant for new carrier types, where there may be no legacy PDCCH. However, for the primary Cell, e-PDCCH may be preceded by a legacy PDCCH 804.

As described above, a search space may be split between PDCCH and e-PDCCH. A UE may be capable of monitoring legacy PDCCH and e-PDCCH simultaneously. As an example, for legacy PDCCH, the common search space and a part of the UE-specific search space may be utilized. For e-PDCCH, part of UE-specific search space may be utilized. In CA and new carrier types, the UE-specific search space may be entirely from e-PDCCH, as described above. Legacy PDCCH may provide fallback operations.

The DCI size of legacy PDCCH and e-PDCCH may not necessarily be the same (e.g., may not have any impact on the number of blind decodes). A UE may only process one unicast DCI for one link in one subframe on a carrier. It may be up to implementation to prioritize in case of detecting two or more DCIs (e.g., some from legacy PDCCH and some from e-PDCCH). Explicit prioritization may also be specified, e.g., e-PDCCH is given a higher priority than the legacy PDCCH. With respect to relay stations, e-PDCCH and R-PDCCH may be in the same subframe. If this is the case, it may be favorable to have TDM-based e-PDCCH at least for DL grants.

Figure 9:
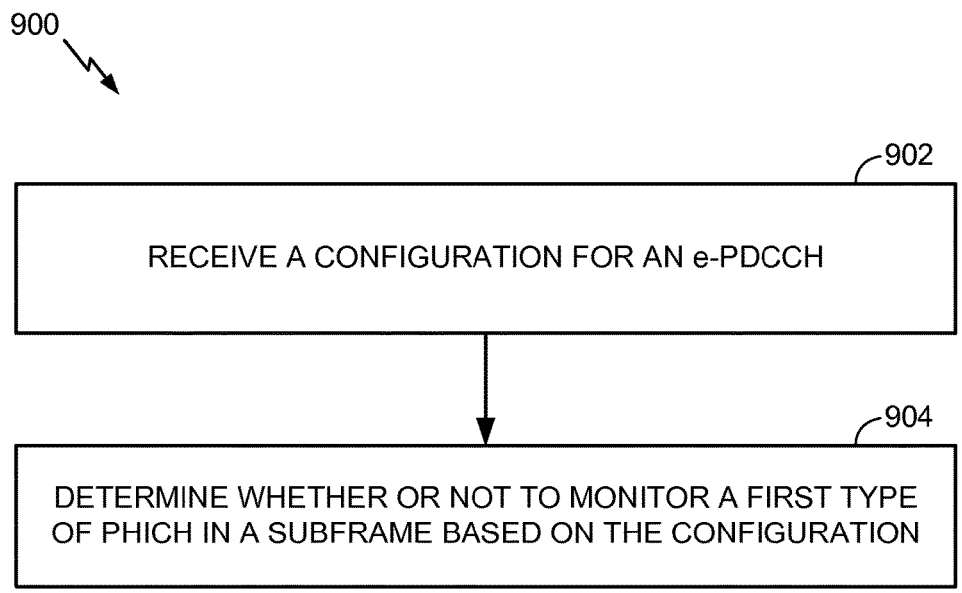
FIGS. 9-12 illustrate example operations, in accordance with various aspects of the present disclosure.

FIG. 9 illustrates example operations 900 that may be performed, for example, by a UE. The operations begin, at 902, by receiving a configuration for an e-PDCCH. As illustrated in FIG. 7, the e-PDCCH may be allocated resources in a region also used for a PDSCH.

At 904, the UE may determine whether or not to monitor a first type of PHICH in a subframe based on the configuration. For certain aspects, the first type of PHICH is a legacy PHICH and the UE may determine not to monitor the first type of PHICH in the subframe if the configuration requires the UE to monitor e-PDCCH in the subframe. If the UE determines not to monitor the first type of PHICH, the UE may determine to monitor a second type of PHICH in the subframe that utilizes resources at a band edge of available frequency resources.

Figure 10:
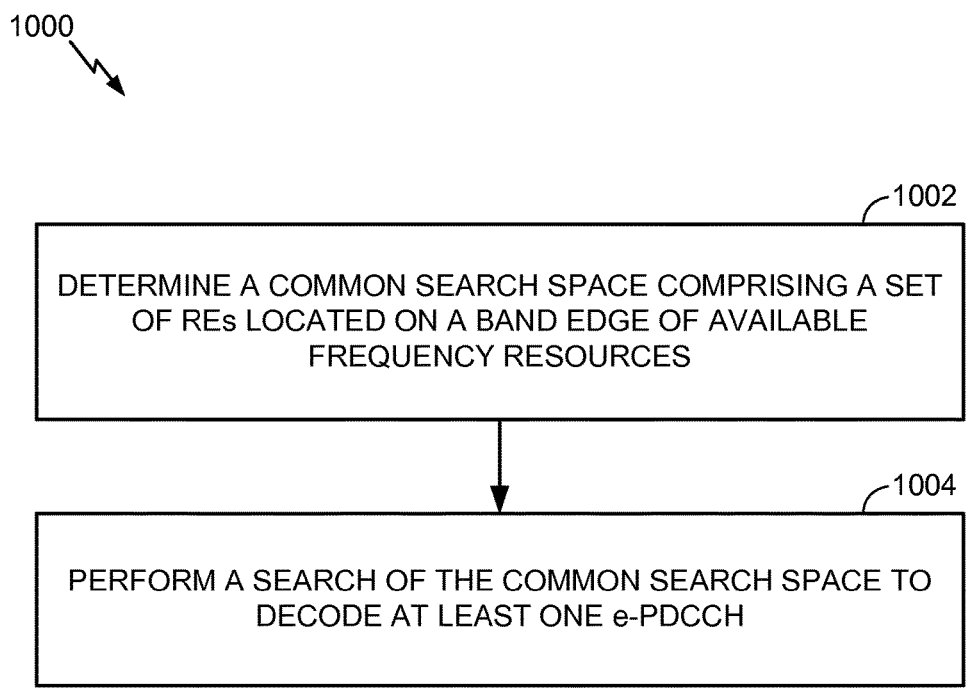

FIG. 10 illustrates example operations 1000 that may be performed, for example, by a UE. The operations begin, at 1002, by determining a common search space comprising a set of resource elements (REs) located on a band edge of available frequency resources. For certain aspects, the set of REs are part of a set of physical resource blocks (PRBs), and the set of PRBs also carry at least a physical hybrid ARQ indicator channel (PHICH). For certain aspects, the UE may receive a message indicating at least a size of the common search space.

At 1004, the UE may perform a search of the common search space to decode at least one e-PDCCH. As illustrated in FIG. 7, the e-PDCCH may be allocated resources in a region also used for a PDSCH. For certain aspects, the e-PDCCH is of a distributed type utilizing non-contiguous resources.

Figure 11:
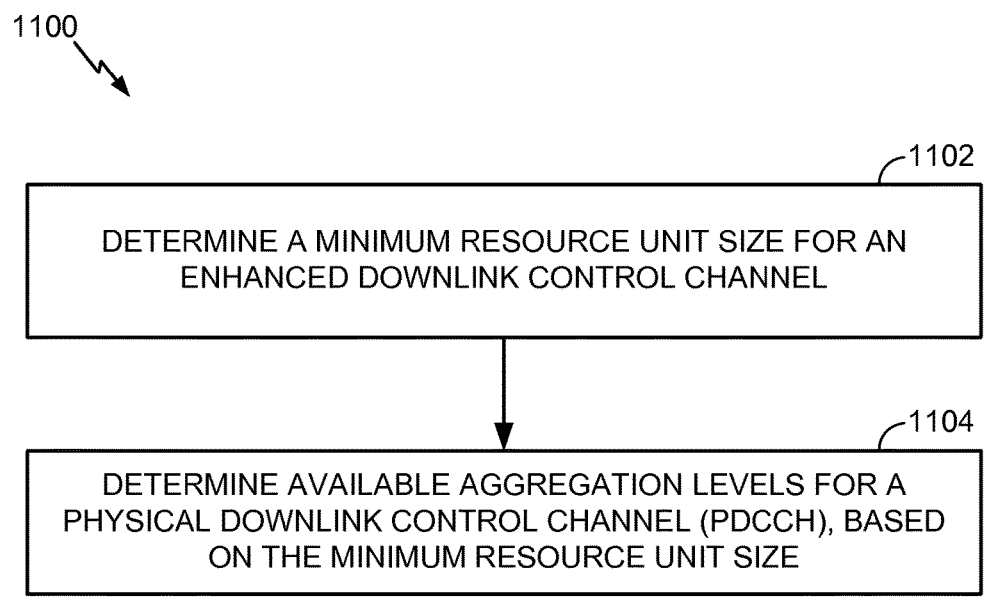

FIG. 11 illustrates example operations 1100 that may be performed, for example, by a user equipment. The operations begin, at 1102, by determining a minimum resource unit size for an enhanced downlink control channel. The operations 1100 continue, at 1104, by determining available aggregation levels for a physical downlink control channel (PDCCH), based on the minimum resource unit size.

Figure 12:
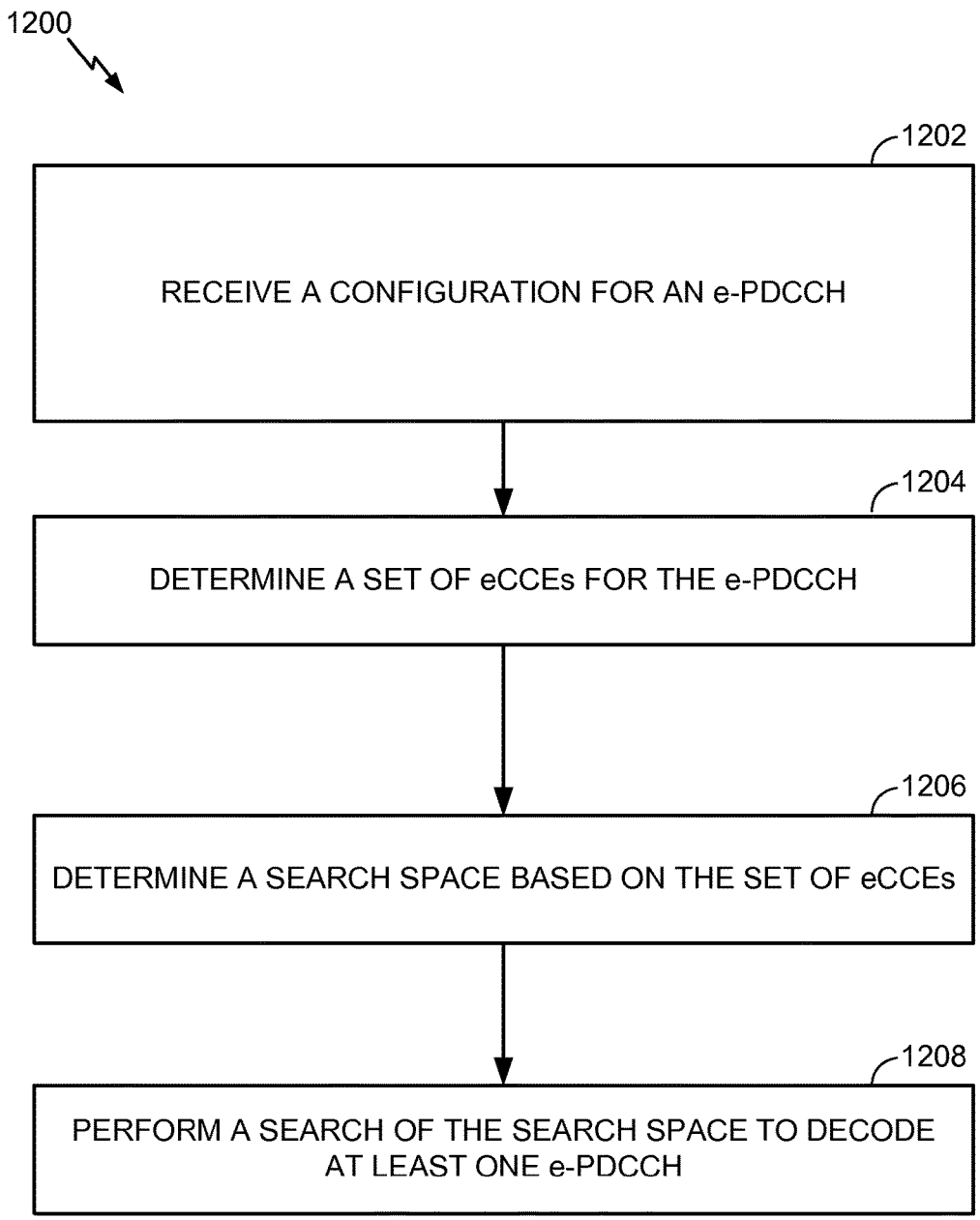

FIG. 12 illustrates example operations 1200 that may be performed, for example, by a user equipment. The operations begin, at 1202, by receiving a configuration for an e-PDCCH. As illustrated in FIG. 7, the e-PDCCH may be allocated resources in a region also used for a PDSCH. The e-PDCCH may be at least one of a localized type or a distributed type.

At 1204, the UE may determine a set of enhanced control channel elements (eCCEs) for the e-PDCCH. At 1206, the UE may determine a search space based on the set of eCCEs. For certain aspects, the search space is determined by a set of logical eCCEs mapped from the set of eCCEs. The mapping generally follows a tree structure, where an e-PDCCH decoding candidate of an aggregation level L has a starting eCCE index of integer multiples of L. The starting eCCE index may be determined based, at least in part, on a hashing function. For certain aspects, the search space generally includes a UE-specific search space.

At 1208, the UE may perform a search of the search space to decode at least one e-PDCCH. For certain aspects, the UE may monitor a legacy PDCCH in a same subframe, wherein the monitoring may be performed only for a common search space. The UE may successfully decode two PDCCHs and select one of the PDCCHs based on a prioritization scheme.

For certain aspects, the UE may determine, within a set of available resources determined by the configuration, a first set of decoding candidates for performing blind decoding to detect a first type of e-PDCCH and a second set of decoding candidates for performing blind decoding to detect a second type of e-PDCCH, and then perform blind decodes of the first and second sets of decoding candidates. The first and second sets of decoding candidates may be split between available resources based, at least in part, on one or more of: different types of search spaces, decoding candidates for an aggregation level, aggregation levels, or downlink control information (DCI) formats. The determination of a number of decoding candidates in the first set and a number of decoding candidates in the second set may be based on a type of the first type of e-PDCCH and a type of the second type of e-PDCCH. For certain aspects, the first type and the second type are the same type, and the determination is based on a predetermined rule. For certain aspects, the first type comprises a localized e-PDCCH, and the second type comprises a distributed e-PDCCH. For certain aspects, the UE may determine a number of resources available for the first type of PDCCH and the second type of PDCCH, and determine available aggregation levels for the first type of PDCCH and the second type of PDCCH, based on the determined number of resources available.

For certain aspects, the UE may receive a configuration of multiple carriers, determine whether a carrier is a primary or secondary carrier, and determine a search space for a legacy PDCCH is not included in the secondary carrier. For certain aspects, the UE may receive a configuration of multiple carriers, receive a cross-carrier scheduling indication, and determine whether to enable cross-carrier scheduling based on whether the control channel is a legacy PDCCH or an e-PDCCH. Cross-carrier scheduling may be enabled for the legacy PDCCH and cross-carrier scheduling may be disabled for the e-PDCCH.

Those skilled in the art will appreciate corresponding operations to FIGS. 9-12 that may be performed at a base station capable of transmitting an enhanced PDCCH, according to aspects described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving a configuration for an enhanced physical downlink control channel (e-PDCCH);
   determining a set of enhanced control channel elements (eCCEs) for the e-PDCCH;
   determining a search space based on the set of eCCEs;
   performing a search of the search space to decode at least one e-PDCCH in a subframe;
   determining, within a set of available resources determined by the configuration, a first set of decoding candidates for performing blind decoding to detect a first type of e-PDCCH and a second set of decoding candidates for performing blind decoding to detect a second type of e-PDCCH, wherein the determining comprises determining a number of decoding candidates in the first set and a number of decoding candidates in the second set based on a type of the first type of e-PDCCH and a type of the second type of e-PDCCH; and
   performing blind decodes of the first and second sets of decoding candidates.

2. The method of claim 1, wherein the search space is determined by a set of logical eCCEs mapped from the set of eCCEs.

3. The method of claim 2, wherein the mapping follows a tree structure, where an e-PDCCH decoding candidate of an aggregation level L has a starting eCCE index of integer multiples of L.

4. The method of claim 1, wherein the e-PDCCH is of at least one of a localized type or a distributed type.

5. The method of claim 1, wherein the search space comprises a UE-specific search space.

6. The method of claim 5, wherein a starting eCCE index is determined based, at least in part, on a hashing function.

7. The method of claim 1, wherein the first and second sets of decoding candidates are split between available resources based, at least in part, on one or more of: different types of search spaces, decoding candidates for an aggregation level, aggregation levels, or downlink control information (DCI) formats.

8. The method of claim 1, wherein:
   the first type and the second type are the same type; and
   the determination is based on a predetermined rule.

9. The method of claim 1, wherein the first type comprises a localized e-PDCCH, and the second type comprises a distributed e-PDCCH.

10. The method of claim 1, further comprising successfully decoding two PDCCHs and selecting one of the PDCCHs based on a prioritization scheme.

11. The method of claim 1, further comprising:
    receiving a configuration of multiple carriers;
    determining whether a carrier is a primary or secondary carrier; and
    determining a search space for a legacy PDCCH is not included in the secondary carrier.

12. The method of claim 1, further comprising:
    receiving a configuration of multiple carriers;
    receiving a cross-carrier scheduling indication; and
    determining whether to enable cross-carrier scheduling based on whether a control channel is a legacy PDCCH or an e-PDCCH.

13. The method of claim 12, wherein cross-carrier scheduling is enabled for the legacy PDCCH and cross-carrier scheduling is disabled for the e-PDCCH.

14. The method of claim 1, further comprising:
    determining a number of resources available for the first type of e-PDCCH and the second type of e-PDCCH; and
    determining available aggregation levels for the first type of e-PDCCH and the second type of e-PDCCH, based on the determined number of resources available.

15. The method of claim 1, further comprising:
    monitoring a legacy PDCCH in the subframe, wherein the monitoring is performed only for a common search space.

16. An apparatus for wireless communications by a user equipment (UE), comprising:
    means for receiving a configuration for an enhanced physical downlink control channel (e-PDCCH);
    means for determining a set of enhanced control channel elements (eCCEs) for the e-PDCCH;
    means for determining a search space based on the set of eCCEs;
    means for performing a search of the search space to decode at least one e-PDCCH in a subframe;
    means for determining, within a set of available resources determined by the configuration, a first set of decoding candidates for performing blind decoding to detect a first type of e-PDCCH and a second set of decoding candidates for performing blind decoding to detect a second type of e-PDCCH, wherein the means for determining comprises means for determining of a number of decoding candidates in the first set and a number of decoding candidates in the second set based on a type of the first type of e-PDCCH and a type of the second type of e-PDCCH; and
    means for performing blind decodes of the first and second sets of decoding candidates.

17. The apparatus of claim 16, wherein the search space is determined by a set of logical eCCEs mapped from the set of eCCEs.

18. The apparatus of claim 17, wherein the mapping follows a tree structure, where an e-PDCCH decoding candidate of an aggregation level L has a starting eCCE index of integer multiples of L.

19. The apparatus of claim 16, wherein the e-PDCCH is of at least one of a localized type or a distributed type.

20. The apparatus of claim 16, wherein the search space comprises a UE-specific search space.

21. The apparatus of claim 20, wherein a starting eCCE index is determined based, at least in part, on a hashing function.

22. The apparatus of claim 16 wherein the first and second sets of decoding candidates are split between available resources based, at least in part, on one or more of: different types of search spaces, decoding candidates for an aggregation level, aggregation levels, or downlink control information (DCI) formats.

23. The apparatus of claim 16, wherein:
    the first type and the second type are the same type; and
    the determination is based on a predetermined rule.

24. The apparatus of claim 16, wherein the first type comprises a localized e-PDCCH, and the second type comprises a distributed e-PDCCH.

25. The apparatus of claim 16, further comprising means for successfully decoding two PDCCHs and selecting one of the PDCCHs based on a prioritization scheme.

26. The apparatus of claim 16, further comprising:
means for receiving a configuration of multiple carriers;
means for determining whether a carrier is a primary or secondary carrier; and
means for determining a search space for a legacy PDCCH is not included in the secondary carrier.

27. The apparatus of claim 16, further comprising:
means for receiving a configuration of multiple carriers;
means for receiving a cross-carrier scheduling indication; and
means for determining whether to enable cross-carrier scheduling based on whether a control channel is a legacy PDCCH or an e-PDCCH.

28. The apparatus of claim 27, wherein cross-carrier scheduling is enabled for the legacy PDCCH and cross-carrier scheduling is disabled for the e-PDCCH.

29. The apparatus of claim 16, further comprising:
means for determining a number of resources available for the first type of e-PDCCH and the second type of e-PDCCH; and
means for determining available aggregation levels for the first type of e-PDCCH and the second type of e-PDCCH, based on the determined number of resources available.

30. The apparatus of claim 16, further comprising:
means for monitoring a legacy PDCCH in the subframe, wherein the means for monitoring is configured to monitor only a common search space.

31. An apparatus for wireless communications by a user equipment (UE), comprising:
at least one processor configured to:
receive a configuration for an enhanced physical downlink control channel (e-PDCCH);
determine a set of enhanced control channel elements (eCCEs) for the e-PDCCH;
determine a search space based on the set of eCCEs;
perform a search of the search space to decode at least one e-PDCCH in a subframe;
determine, within a set of available resources determined by the configuration, a first set of decoding candidates for performing blind decoding to detect a first type of e-PDCCH and a second set of decoding candidates for performing blind decoding to detect a second type of e-PDCCH by determining a number of decoding candidates in the first set and a number of decoding candidates in the second set based on a type of the first type of e-PDCCH and a type of the second type of e-PDCCH; and
perform blind decodes of the first and second sets of decoding candidates; and
a memory coupled to the at least one processor.

32. The apparatus of claim 31, wherein the search space is determined by a set of logical eCCEs mapped from the set of eCCEs.

33. The apparatus of claim 32, wherein the mapping follows a tree structure, where an e-PDCCH decoding candidate of an aggregation level L has a starting eCCE index of integer multiples of L.

34. The apparatus of claim 31, wherein the e-PDCCH is of at least one of a localized type or a distributed type.

35. The apparatus of claim 31, wherein the search space comprises a UE-specific search space.

36. The apparatus of claim 35, wherein a starting eCCE index is determined based, at least in part, on a hashing function.

37. The apparatus of claim 31, wherein the first and second sets of decoding candidates are split between available resources based, at least in part, on one or more of: different types of search spaces, decoding candidates for an aggregation level, aggregation levels, or downlink control information (DCI) formats.

38. The apparatus of claim 31, wherein:
the first type and the second type are the same type; and
the determination is based on a predetermined rule.

39. The apparatus of claim 31, wherein the first type comprises a localized e-PDCCH, and the second type comprises a distributed e-PDCCH.

40. The apparatus of claim 31, wherein the at least one processor is further configured to successfully decode two PDCCHs and select one of the PDCCHs based on a prioritization scheme.

41. The apparatus of claim 31, wherein the at least one processor is further configured to:
receive a configuration of multiple carriers;
determine whether a carrier is a primary or secondary carrier; and
determine a search space for a legacy PDCCH is not included in the secondary carrier.

42. The apparatus of claim 31, wherein the at least one processor is configured to:
receive a configuration of multiple carriers;
receive a cross-carrier scheduling indication; and
determine whether to enable cross-carrier scheduling based on whether a control channel is a legacy PDCCH or an e-PDCCH.

43. The apparatus of claim 42, wherein cross-carrier scheduling is enabled for the legacy PDCCH and cross-carrier scheduling is disabled for the e-PDCCH.

44. The apparatus of claim 31, wherein the at least one processor is configured to:
determine a number of resources available for the first type of e-PDCCH and the second type of e-PDCCH; and
determine available aggregation levels for the first type of e-PDCCH and the second type of e-PDCCH, based on the determined number of resources available.

45. A non-transitory computer-readable medium for wireless communications by a user equipment (UE), the non-transitory computer-readable medium having code for:
receiving a configuration for an enhanced physical downlink control channel (e-PDCCH);
determining a set of enhanced control channel elements (eCCEs) for the e-PDCCH;
determining a search space based on the set of eCCEs;
performing a search of the search space to decode at least one e-PDCCH in a subframe;
determining, within a set of available resources determined by the configuration, a first set of decoding candidates for performing blind decoding to detect a first type of e-PDCCH and a second set of decoding candidates for performing blind decoding to detect a second type of e-PDCCH, wherein the determining comprises determining a number of decoding candidates in the first set and a number of decoding candidates in the second set based on a type of the first type of e-PDCCH and a type of the second type of e-PDCCH; and performing blind decodes of the first and second sets of decoding candidates.

\* \* \* \* \*